US011886133B2

(12) United States Patent
Robles Flores et al.

(10) Patent No.: US 11,886,133 B2
(45) Date of Patent: Jan. 30, 2024

(54) PRINTING DEVICE WITH CYLINDRICAL INTERMEDIATE TRANSFER MEMBER

(71) Applicant: Xerox Corporation, Norwalk, CT (US)

(72) Inventors: Eliud Robles Flores, Webster, NY (US); Paul F Sawicki, Rochester, NY (US); Douglas A Gutberlet, Ontario, NY (US); Varun Sambhy, Pittsford, NY (US)

(73) Assignee: XEROX CORPORATION, Norwalk, CT (US)

(*) Notice: Subject to any disclaimer, the term of this patent is extended or adjusted under 35 U.S.C. 154(b) by 90 days.

(21) Appl. No.: 17/551,454

(22) Filed: Dec. 15, 2021

(65) Prior Publication Data

US 2023/0185219 A1 Jun. 15, 2023

(51) Int. Cl.
*G03G 15/16* (2006.01)
*G03G 15/01* (2006.01)

(52) U.S. Cl.
CPC ....... *G03G 15/162* (2013.01); *G03G 15/0131* (2013.01); *G03G 15/1605* (2013.01); *G03G 2215/1614* (2013.01); *G03G 2215/1619* (2013.01)

(58) Field of Classification Search
CPC ........... G03G 15/0131; G03G 15/1605; G03G 15/162; G03G 15/1685; G03G 2215/1614; G03G 2215/1619
See application file for complete search history.

(56) References Cited

U.S. PATENT DOCUMENTS

| | | | | |
|---|---|---|---|---|
| 5,418,349 | A | 5/1995 | Swain et al. | |
| 5,732,311 | A * | 3/1998 | May | G03G 5/142 430/60 |
| 5,845,185 | A * | 12/1998 | Sakagami | G03G 15/162 399/302 |
| 6,456,816 | B1 * | 9/2002 | Chowdry | G03G 15/162 399/302 |
| 7,869,739 | B2 | 1/2011 | Mashtare et al. | |
| 8,005,410 | B2 | 8/2011 | Wu | |
| 2006/0257769 | A1 | 11/2006 | Wu et al. | |
| 2008/0138724 | A1 | 6/2008 | Belknap et al. | |
| 2009/0035679 | A1 | 2/2009 | Wu | |
| 2009/0162761 | A1 | 6/2009 | Law et al. | |
| 2009/0246668 | A1 | 10/2009 | Wu | |
| 2011/0256475 | A1 | 10/2011 | Yu | |
| 2012/0051803 | A1 | 3/2012 | DiRubio et al. | |
| 2019/0041793 | A1 | 2/2019 | Burdon et al. | |
| 2020/0159160 | A1 | 5/2020 | Yoshimoto | |

* cited by examiner

*Primary Examiner* — Joseph S Wong
(74) *Attorney, Agent, or Firm* — Lippes Mathias LLP

(57) ABSTRACT

A transfer member for a printing device includes a shaft, a rigid cylindrical core member, mounted on the shaft, an outer layer supported on the rigid cylindrical core member, and optionally a conformable intermediate layer, spacing the cylindrical core member from the outer layer. The outer layer defines an outer surface of the transfer member, and is configured for receiving a toner image thereon. The cylindrical core and outer layer have a same axis of rotation as the shaft. The rigid cylindrical core and/or the conformable intermediate layer, where present may be electrically biased, relative to a photoconductor drum of the printing device.

16 Claims, 6 Drawing Sheets

PRINTING DEVICE WITH CYLINDRICAL INTERMEDIATE TRANSFER MEMBER

BACKGROUND

The exemplary embodiment relates to a printing device and a method of printing and finds particular application in connection with a multicolor electrographic printing device with a transfer member which can accommodate a variable number of toner image sources.

Generally, the process of electrophotographic (xerographic) printing includes charging a photoconductive member to a substantially uniform potential to sensitize the surface thereof. The charged portion of the photoconductive surface is exposed to a light image from either a scanning laser beam, an LED source, or an original document being reproduced. This records an electrostatic latent image on the photoconductive surface. After the electrostatic latent image is recorded on the photoconductive surface, the latent image is developed with a toner material containing toner particles. The toner particles are attracted to the latent image, forming a toner powder image on the photoconductive surface. The toner powder image is subsequently transferred to a sheet of print media, such as paper. Finally, the toner powder image is heated to fuse it more permanently to the sheet.

The electrophotographic printing process given above can be modified to produce color images by superimposing toner powder images of different color toners onto the photoreceptor prior to the transfer of the composite toner powder image onto the sheet.

Existing electrophotographic color printing devices often use a photoreceptor belt on which the toner powder images are formed at respective color stations around the belt. In one such printing device, the toner powder images are sequentially transferred to the sheet at a single transfer station. One problem with a photoreceptor belt is that accurate registration of multiple toner powder images is difficult, due to the flexible nature of the belt. Additionally, such printing devices tend to have a large footprint, particularly when more than four color stations are used. In another printing device, toner powder images are transferred from respective photoreceptor drums to an intermediate transfer belt, from which the individual toner images are transferred to the sheet. This type of printing device employs a transfer station for each color station and a further transfer station from the intermediate belt to the sheet, making the run cost of such a device relatively high. Additionally, adding an additional color station to such printing devices is a complicated and time consuming process.

There remains a need for a printing device which is compact, while allowing high print speeds without sacrificing print quality.

INCORPORATION BY REFERENCE

The following references, the disclosures of which are incorporated herein in their entireties by reference, are mentioned:

U.S. Pat. No. 8,005,410 B2, issued Aug. 2, 2011, entitled POLYIMIDE INTERMEDIATE TRANSFER COMPONENTS, by Wu, describes an intermediate transfer belt that includes a thermosetting polyimide.

U.S. Pub. No. 20080138724 A1, published Jun. 12, 2008, entitled IMAGING MEMBER, by Belknap, et al., describes a photoreceptor drum with a charge transport layer comprising a substituted terphenyl diamine Imaging members which can include a rigid drum are also mentioned, for example, in U.S. Pub. Nos. 20060257769 A1, 20090035676 A1, 20090162761 A1, 20090246668 A1, 20110256475 A1, 20200159160 A1, and 20190041793 A1.

U.S. Pub. No. 20120051803, published Mar. 1, 2012, entitled IMAGE TRANSFER ROLLER (ITR) UTILIZING AN ELASTOMER CROWN, by DiRubio, et al., describes an image transfer roller (ITR) utilizing an elastomer crown, imaging devices and imaging apparatus using the disclosed ITR.

U.S. Pat. No. 5,418,349, issued May 23, 1995, entitled PROCESS FOR REDUCING THICKNESS OF A POLYMERIC PHOTOCONDUCTIVE COATING ON A PHOTORECEPTOR WITH LASER, by Swain, et al., describes a photoreceptor drum which includes a rigid cylindrical substrate having an outer coating of photoconductive material formed over the substrate.

U.S. Pat. No. 7,869,739, issued Jan. 11, 2011, entitled TWO-COLOR IOI DRUM MODULE ENABLING N-COLOR MONOCHROME, HIGHLIGHT, FULL COLOR, PHOTOTONE COLOR AND EXTENDED COLOR ARCHITECTURES, by Mashtare, et al., describes a xerographic marking device including an intermediate transfer unit, a media transport path and a two-color image-on-image (IOI) drum module. The intermediate transfer unit receives first and second toned images from the photoreceptor in a single transfer and transfers them to print media.

BRIEF DESCRIPTION

In accordance with one aspect of the exemplary embodiment, a transfer member for a printing device includes a shaft, a rigid cylindrical core member, mounted on the shaft, an outer layer supported on the rigid cylindrical core member, and optionally a conformable intermediate layer, spacing the cylindrical core member from the outer layer. The outer layer defines an outer surface of the transfer member, which is configured for receiving a toner image thereon. The cylindrical core and outer layer have a same axis of rotation as the shaft. An electrical conductor is provided for electrically biasing one of the rigid cylindrical core and the conformable intermediate layer, where present.

In another aspect, a main marking station includes the transfer member described above and a plurality of color stations, each of the color stations including a photoreceptor drum, each of the photoreceptor drums and the outer surface of the transfer member defining a respective first transfer nip therebetween, whereby toner image layers are transferred from the photoreceptor drum to the transfer member.

In another aspect, a printing device includes the main marking station described above, and a print media path which conveys associated sheets of print media to a second transfer nip where the toner image layers are transferred from the transfer member to the sheets to form toner images. A fuser, downstream of the main marking station, fuses the toner images more permanently to the sheets.

The printing device may further include at least one of: a pre-marking station, located upstream of the main marking station, which prints a toner image layer on an associated sheet of print media, and a post-marking station, located downstream of the main marking station, which prints a toner image layer on the associated sheet of print media, whereby a toner image is formed on the associated sheet from two or more toner image layers printed by the main marking station and the at least one of the pre-marking station and the post-marking station. The print media path connects the main marking station and the at least one of the pre-marking station and post-marking station with the fuser.

In accordance with another aspect, a method of printing with the printing device described above includes forming toner image layers on the plurality of photoreceptor drums, transferring the toner image layers to the surface of the transfer member, transferring the toner image layers from the surface of the transfer member to a sheet of print media to form a toner image, and fusing the toner image more permanently to the sheet with the fuser.

In accordance with another aspect of the exemplary embodiment, a method of forming a transfer member for a printing device includes providing a rigid cylindrical core member, forming an electrically-conductive intermediate layer on the core member, forming an outer layer on the intermediate layer the outer layer defining an outer surface of the transfer member, the cylindrical core and outer layer having a common axis of rotation, the intermediate layer being more compressible than the outer layer, mounting the core member on a shaft, and providing an electrical conductor, which electrically biases the intermediate layer, relative to a photoconductor drum, for attracting toner images from the photoconductor drum to the outer surface of the transfer member.

In accordance with another aspect of the exemplary embodiment, a printing device includes a cylindrical transfer member including a rigid cylindrical core member, an intermediate layer formed from a dielectric material, bonded to the core member, and an outer layer bonded to the intermediate layer, the outer layer defining an outer surface of the transfer member. A plurality of color stations is arranged around the transfer member, each of the color stations including a photoreceptor drum on which toner image layers are formed, the photoreceptor drum being electrically biased relative to the surface of the transfer member, the toner image layers being transferred from the photoreceptor drum and the surface of the transfer member at a first transfer nip and transferred from the transfer member to a sheet of print media at a second transfer nip.

DETAILED DESCRIPTION

Aspects of the exemplary embodiment relate generally to a printing device ("printer") in which toner images are transferred directly from a surface of a photoreceptor drum to a surface of a transfer member which includes a rigid drum on which one or more concentric layers of material are supported.

As used herein, a "printing device" can include any device for rendering an image on print media, such as a copier, laser printer, bookmaking machine, facsimile machine, or a multifunction machine (which includes one or more functions such as scanning, printing, archiving, emailing, and faxing).

"Print media" can be a usually flimsy physical sheet of paper, plastic, or other suitable physical print media substrate for images. A "print job" or "document" is normally a set of related sheets, usually one or more collated copy sets copied from a set of original print job sheets or electronic document page images, from a particular user, or otherwise related.

An image generally may include information in electronic form which is to be rendered on the print media by the printing device and may include text, graphics, pictures, and the like. The operation of applying images to print media, for example, graphics, text, photographs, etc., is generally referred to herein as printing or marking.

A "finisher" can be any post-printing accessory device, such as a tray or trays, sorter, mailbox, inserter, interposer, folder, stapler, stacker, hole puncher, collater, stitcher, binder, envelope stuffer, postage machine, or the like.

A "document" is used herein to mean an electronic (e.g., digital) or physical (e.g., paper) recording of information.

Figure 1:
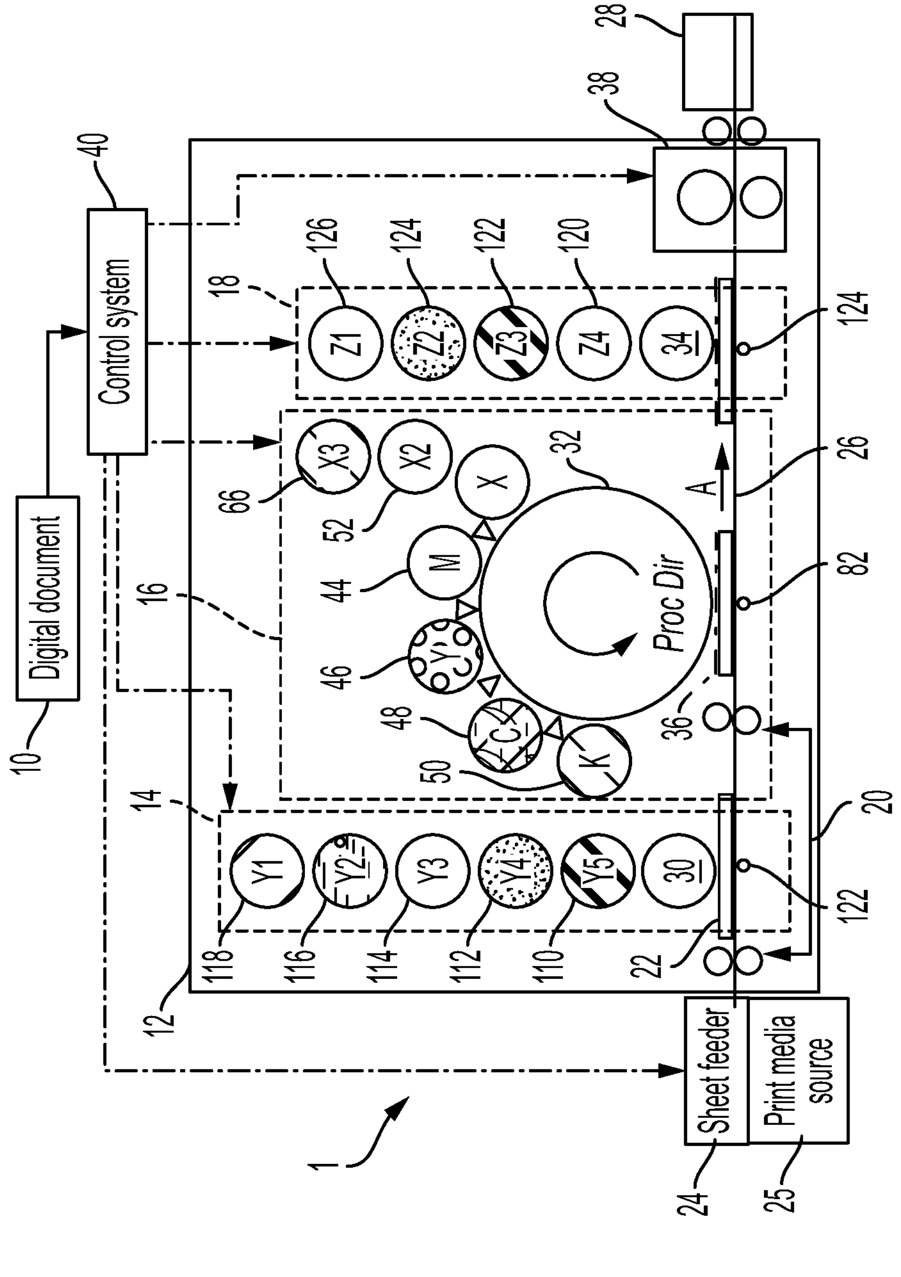
FIG. 1 is a functional block diagram of a printing system in accordance with one aspect of the exemplary embodiment.

With reference to FIG. 1, a printing device 1 for rendering a digital document 10 in hardcopy form is illustrated. The printing device 1 includes an electrophotographic marking device 12, which includes one or more marking stations 14, 16, 18. A transport mechanism 20 conveys sheets 22 of print media from a sheet feeder 24, associated with a source 25 of print media, to each of the marking stations 14, 16, 18 in turn. The sheets are transported along a paper path 26, in the direction of arrow A, from the sheet feeder to the marking station(s), and ultimately to an output device 28, optionally via one or more intermediate processing stations (not shown).

Each marking station 14, 16, 18 includes a transfer member 30, 32, 34, which is configured to transfer a toner image 36 directly to each or some of the passing sheets 22. A fuser 38, downstream of the marking stations 14, 16, 18, applies at least one of heat and pressure to the sheet to physically attach the toner particles more permanently to the sheet and optionally to provide a level of gloss to the printed media. As will be appreciated, while a single fuser 38 is illustrated, a separate fuser may be provided for each marking station. One or more processing stations, such as a finisher, may be provided in the print media path between the fuser 38 and the output device 28.

For duplex printing, a return path (not shown), may be configured to return the printed sheet to the marking station(s) 14, 16, 18 to form a printed toner image on the opposite side of the sheet. Alternatively, a further set of marking station(s) analogous to station(s) 14, 16, 18 and a second fuser, analogous to fuser 38, may be provided downstream of the first fuser 38.

The various hardware components 14, 16, 18, 24, 28, 38 of the printing device 1 may be under the control of a common control system 40. The control system 40 may include one or more computing devices, e.g., including a hardware processor which executes software instructions for controlling the hardware components. The control system 40 may also function to process an incoming digital document 10 identify which of the marking stations 14, 16, 18 and/or which colors will be employed to form layers of the toner image 36 and provide appropriate printing instructions to each station, as in a conventional printing device. Each of the marking stations 14, 16, 18 may include one or more of an input/output interface, a memory, a marking cartridge platform, a marking driver, a function switch, a controller and a self-diagnostic unit, all of which can be interconnected by a data/control bus.

Figure 2:
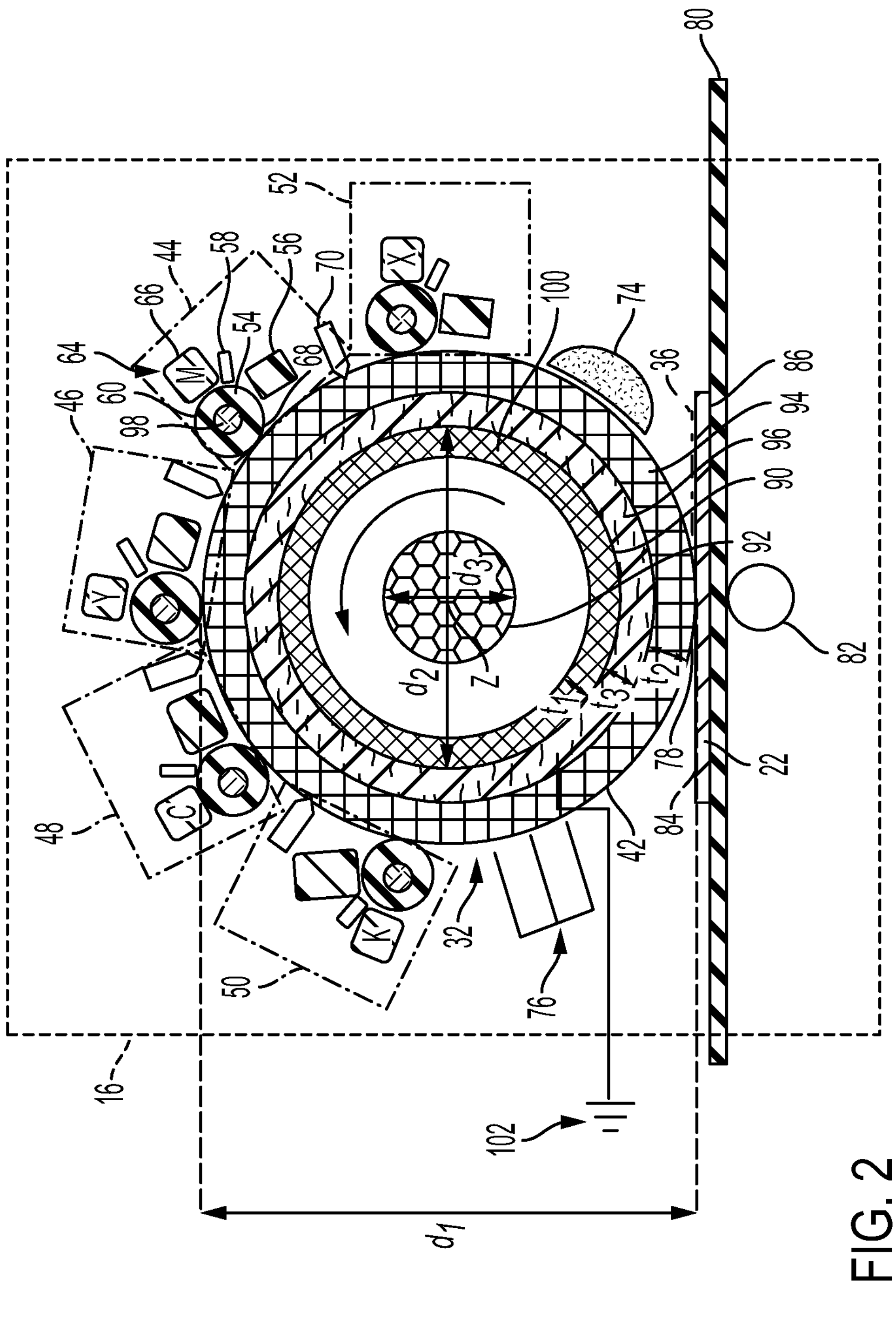
FIG. 2 is a side sectional view of a main marking station of the printing system of FIG. 1, with a transfer member in accordance with a first aspect.

With reference also to FIG. 2, the transfer member 32 of the main marking station 16 is in the form of a cylindrical drum with a circular cross-section. Toner images 36 (or toner image layers which are combined to form the toner image) that are transferred to a surface 42 of the transfer member 32 are transferred directly therefrom to the print media sheets 22. Disposed at various points around the circumference of the transfer drum 32 are a plurality of color stations 44, 46, 48, 50 and optionally 52, one for each of the toner powder colors to be employed in the main marking station 16. While five color stations 44, 46, 48, 50 and 52 are illustrated, for magenta, yellow, cyan, and black (M, Y, C, K) and a fifth toner color (denoted X), fewer or more than five color stations may be employed, such as at least three, at least four, at least five, at least six or seven color stations. X may be, for example, a custom-color, metallic, magnetic (MICR), and/or transparent toner. There may be two or more additional interchangeable colorants X2, X3, etc., which can be used in the fifth color station 52, as illustrated in FIG. 1.

As illustrated in FIG. 2 for color station 44, each color station 44, 46, 48, 50, 52 includes a respective photoreceptor drum 54, with various electrophotographic substations arranged around the drum 54. These may include a charging station 56, such as a charging corotron, which charges the photoreceptor drum, an exposure station 58, which forms a latent image on a photoconductive surface 60 of the photoreceptor drum 54, a developer unit 64, associated with the charging station for developing the latent image formed on the surface of the photoreceptor drum by applying a toner to obtain a toner image. The illustrated developer unit 64 includes a developer housing 66, which holds a supply of a developer material, such as toner particles alone or magnetic carrier granules having toner particles tribo-electrically charged and adhering thereto. The toner particles are attracted to the latent image on the photoconductive surface 60 of the photoreceptor drum 54, to form an image layer thereon, which is subsequently transferred to the transfer drum 32 at a first transfer nip 68. The photoreceptor drum 54 is thus in contact with, and may be at least partially driven by, the transfer member 32. The layers of toner particles may be deposited, by the color stations 44, 46, 48, 50, 52, one on top of the other, in the form of a pile, on the transfer member 32.

In addition to the color stations 44, 46, 48, 50, 52, other components may be positioned around the transfer member 32. Optionally, a pre-transfer station 70 is positioned before the transfer nip 68 of one or more of the color stations 44, 46, 48, 50 (e.g., C and K, and optionally also M and Y), to improve toner image transfer to the transfer member 32. Other components may include a cleaning device 74 and an optional pre-transfer device 76, which is located between the last color station 50 and a second transfer nip 78, formed between the transfer member 32 and a sheet support member 80. The sheet support member is driven by the surface 42 of the transfer member 32 or by a separate drive mechanism (not shown). A transferring unit 82, such as a transfer corotron, assists in transferring the toner image layers directly from the surface 42 of the transfer member 32 to an upper surface 84 of a print media sheet 22 to form the toner image 36 on the sheet. The illustrated transferring unit 82 is spaced from a lower surface 86 of the sheet 22 by the support member 80, which may be a conveyor belt or other support structure, and which forms a part of the transport mechanism.

The illustrated transfer member 32 includes a rigid core member 90, which incorporates, or is connected to, a drive shaft 92. The drive shaft may include an axel extending axially through the rigid core member from one end to the other, and/or may be connected to one or both ends 93 of the core member and extend axially outward therefrom. The drive shaft is driven by an associated motor (not shown) to rotate the cylindrical transfer member 32 at a selected speed.

Figure 3:
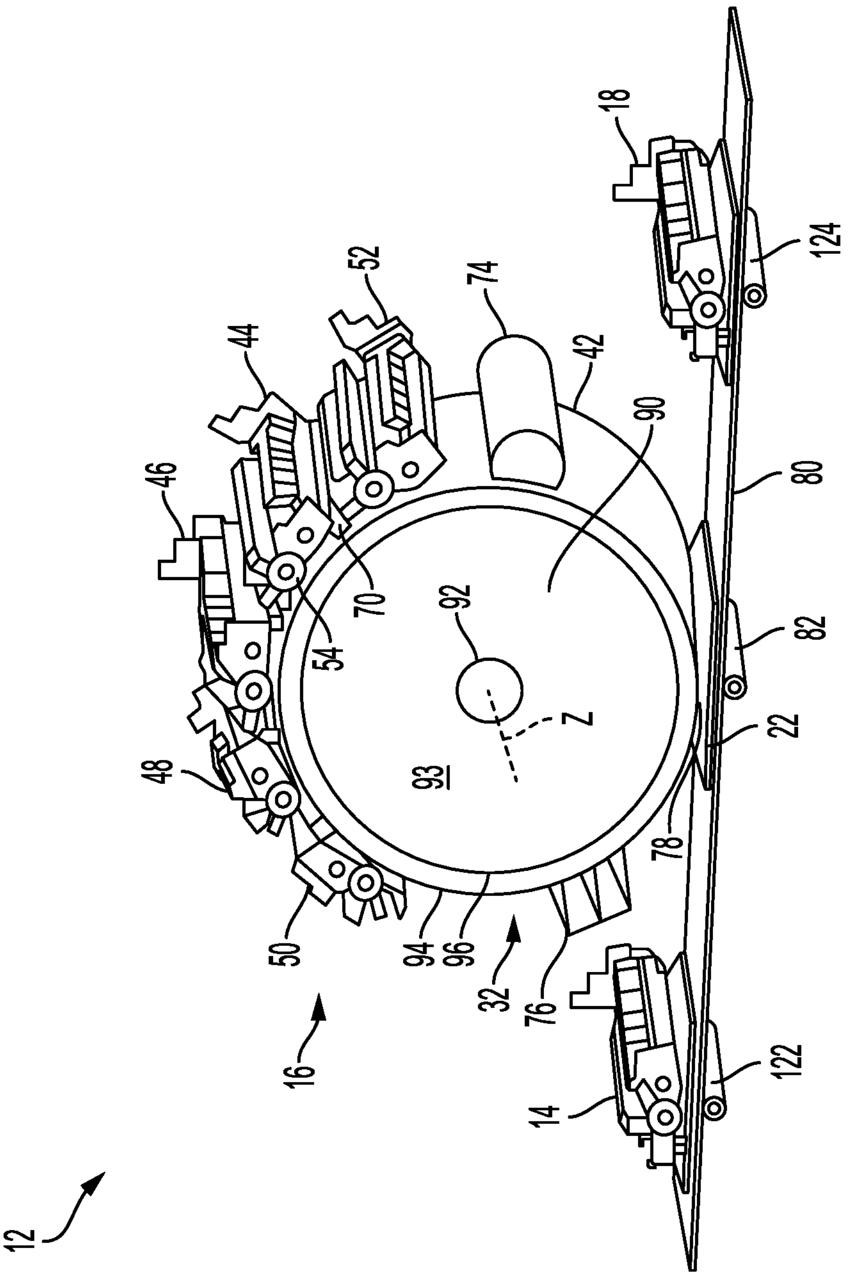
FIG. 3 is a perspective view of a marking device of FIG. 1, in accordance with the first aspect.

The core member 90 may be a rigid, self-supporting, hollow cylindrical drum, which is closed at both ends 93, as illustrated in FIG. 3, or may be a solid cylindrical structure. Concentric layers 94, 96, 98 are supported on the core member 90. For example, a cylindrical outer layer 94 of the transfer member 32 defines the cylindrical surface 42 of the transfer member 32. The outer layer 94 may be spaced from the core member 90 by one or more cylindrical, conformable intermediate layers 96. The outer layer 94 and inner layer 96, where present, are both continuous and may be seamless.

It should be noted that in FIG. 2, the shaft 92, core member 90, and layers 94 and 96 are not to scale, simply for ease of illustration.

The shaft 92 defines an axis of rotation z of the transfer member 32. The core member 90 and layers 94, 96 thus share the same axis of rotation z, i.e., are concentric. A shaft 98 of each photoreceptor drum 54 defines an axis of rotation of the photoreceptor drum, which is parallel to the z axis. The axes of rotation of the photoreceptor shafts 98 are arranged in an arc which is concentric with respect to the z axis, core member 90 and layer(s) 94, 96.

In the case where the intermediate layer 96 is present, the transfer member 32 may be conformable, i.e., the outer surface 42 of the drum is not rigid but can flex to some degree, when contacted by the photoreceptor drum 54. This assists in providing a uniform area of contact between the transfer member 32 and photoreceptor drum 54 at the nip 68 and helps to maintain a matching speed of the photoreceptor drum. In the case where the intermediate layer 96 is absent, the transfer member 32 may be less conformable, i.e., more rigid. In this embodiment, a speed of a shaft 98 of the photoreceptor drum 54 may be carefully controlled by a respective drive motor (not shown) to match the speed of the transfer member 32 without slipping.

The transfer member 32 may be of any suitable size to allow the desired number of color stations 44, 46, 48, 50, 52 and other subsystems to be arranged around it. In one embodiment, the transfer member 32 has a diameter $d_1$ of at least 20 cm, such as at least 40 cm, or at least 50 cm, e.g., up to 100 cm, or up to 80 cm, or up to 60 cm, e.g., about 51 cm.

The cylindrical core member 90 may have an outer diameter $d_2$ of at least 19 cm, such as at least 39 cm, or at least 49 cm, or up to 100 cm, or up to 80 cm, or up to 60 cm, or about 50.8 cm. A ratio of $d_2$:$d_1$ may be at least 0.8:1 or at least 0.9:1 or at least 0.95:1 and may be up to 0.999:1, or up to 0.998:1, or up to 0.995:1.

The core member 90, when in the shape of a hollow drum, may have a cylindrical wall 100 with a radial thickness $t_1$ of at least 1 mm, such as at least 2 mm, or at least 3 mm, or up to 2 cm, or up to 1 cm, or up to 5 mm.

The shaft 92 may have a diameter $d_3$ of less than the diameter $d_2$, e.g., at least 1 cm, such as at least 2 cm, or at least 4 cm, or up to 10 cm.

The outer layer 94 may have a radial thickness $t_2$ of at least 0.01 mm, or at least 0.025 mm, up to 0.5 mm, e.g., up to 1 mm, or up to 0.075 mm, e.g., about 0.05 mm. The outer diameter of the outer layer 94 corresponds to $d_1$.

The intermediate, conformable layer 96, where present, may have a radial thickness $t_3$ of at least 1 mm, or at least 2 mm, or at least 3 mm, or at least 4 mm, or up to 20 mm, or up to 10 mm, or up to 8 mm.

The core member 90 may be formed substantially (at least 80 wt. % or at least 90 wt. %), or entirely (100 wt. %), of metal or a metal alloy, such as aluminum or steel, or may be formed from another rigid material, such as glass.

The cylindrical shaft 92 may be formed substantially (at least 80 wt. % or at least 90 wt. %), or entirely (100 wt. %), of metal or a metal alloy, such as aluminum or steel, e.g., of the same material as the core member 90.

The outer layer 94 may be resilient and may include an organic polymer, such as a polyimide, e.g., as a major component thereof. An example polyimide is a thermosetting polyimide. The thermosetting polyimide may be one which is cured at low temperatures, such as less than about 290° C., e.g., up to 260° C., or up to 215° C., such as at least 180° C., or at least 190° C., over a short period of time, such as for example, from about 10 to 120 minutes, or from 20 to 60 minutes. The polyimide may be prepared by the reaction of an aromatic diamine with an aromatic dicarboxylic acid, where the amine or carboxylic acid or both contains a C═C group. Two reactions are expected to occur during cure: (1) nominal but incomplete imidization; and (2) free radical polymerization of the C═C groups, which permits a high tensile strength. One such polyimide is available as VTEC™ PI 1388 from Richard Blaine International, Inc., Reading, Pa. In contrast, for other known polyimides, there exists only a single imidization during cure, and no other crosslinking, such as free radical polymerization, thus curing at higher temperatures is generally needed to obtain a high tensile strength. Such thermosetting polyimides are generally cured at temperatures over 300° C., e.g., from about 305 to about 350° C., over a period of time, such as from 150 to 240 minutes. Examples of such polyimide are KAPTON® polyimides available from E. I. DuPont.

The exemplary polyimide may have a number average molecular weight $M_n$ of from 10,000 to 100,000 Daltons and a weight average molecular weight $M_w$ of from 100,000 to 1,000,000 Daltons, as determined by gel permeation chromatography using a polystyrene standard. The thermosetting polyimide may be present in the outer layer at up to 100 wt. %, or at least 50 wt. %, such as from 60 to 99 wt. %, or from 80 to 95 wt. %.

In one embodiment, the outer layer 94 may further include other organic polymers, such a polyaniline, e.g., a lignosulfonic acid grafted polyaniline. The polyaniline may be in the form of particles, which are dispersed in the polyimide, and which may have a particle size diameter of from 0.5 to 5 microns. A ratio, by weight, of the polyimide to polyaniline may be at least 2:1, such as at least 10:1, or up to 100:1.

In addition to the organic polymer(s), the outer layer 94 may include one or more electrically-conductive fillers such as ionic additives and/or carbon black. A ratio of polyimide to filler may be at least 10:1, such as up to 1000:1.

The outer layer 94 may be formed by curing a polyimide-containing composition (e.g., in the form of a coating) in situ, either directly on the core 90 or directly on the intermediate layer 96, where present. The polyimide-containing composition includes the thermosetting polyimide, optionally one or more of a polyaniline and a conductive filler, and optionally one or more suitable solvents, such as N-methyl-2-pyrrolidone. This method allows a continuous layer 94 to form, without any seams, which is firmly attached to the intermediate layer or core. In another embodiment, a sheet of material for forming the outer layer is wrapped around the intermediate layer and bonded thereto, e.g., with an adhesive or by an as yet incompletely set intermediate layer. The outer layer 94 may be formed of two or more sublayers, laid down one on top of the other, in a similar manner.

The outer layer 94 may have a surface resistivity of from $10^{10}$ to about $10^{12}$ ohm/sq.

The intermediate layer 96 may be formed of a dielectric material, which is a solid, rather than a liquid or a gas. For example, the dielectric constant (the ratio of electric flux generated by an electrical field in the layer to that generated by the field in a vacuum) at 20° C. of the intermediate layer 96 may be at least 8, or at least 12, or at least 20, or at least 25, such as up to 40. The dielectric material may be a conformable material, such as an open cell polymeric foam. By "conformable," it meant that the layer compresses more, under a given pressure, than the core member and outer layer. An example foam is an epichlorohydrin (ECH) rubber foam. Epichlorohydrin rubber is an elastomer produced by ring-opening copolymerization of chloromethyloxirane (epichlorhydrin) and oxirane (ethylene oxide).

The conformable material, e.g., foam, may have a compression deflection, measured at 25% according to ASTM D1056, of from 10-180 kPa and a density, measured according to ASTM D 1056, of 0.18 to 0.5 g/cm$^3$. The intermediate layer 96 may be formed of two or more sublayers, laid down one on top of the other, with the outermost sublayer bonded to the outer layer 94 and the innermost sublayer bonded to the core 90.

The intermediate layer 96 may be formed by applying a foam composition (e.g., in the form of a coating containing reagents for forming the foam) on the core 90 and curing the composition in situ. Alternatively, a sheet of an at least partially cured foam may be wrapped around the core and a seam formed to complete the layer. In this latter embodiment, an adhesive may be employed to bond the layer 96 to the core.

Other dielectric materials, such as glass, may alternatively be used as the intermediate layer.

An electrical bias (voltage differential) between the surfaces of the photoconductor drums 54 and the transfer member 32 causes transfer of the toner image 36 from the respective drum surfaces 60 to the surface 42 of the transfer member. In one embodiment, this is achieved by electrically grounding the intermediate layer 96, by connecting the intermediate layer (directly, or indirectly, via the axel 92) to an electrical conductor, as illustrated at 102, while the photoreceptor drums 54 have a negative voltage. To electrically ground the intermediate layer 96, a mechanical interconnection may thus be provided between the intermediate layer and a support frame of the marking device 16. Alternatively, a (positive) bias voltage may be applied to the intermediate layer 96.

Figure 4:
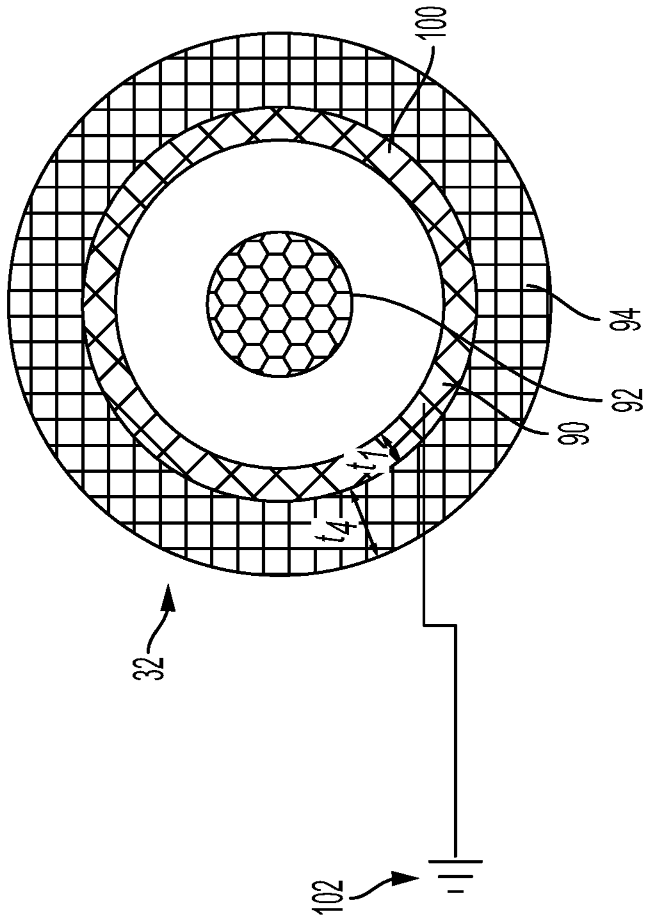
FIG. 4 is a side sectional view of a transfer member of the printing system of FIG. 1, in accordance with a second aspect.

With reference to FIG. 4, an embodiment of a transfer member 32 without an intermediate layer 96 is illustrated, which may be configured as for the transfer member of FIGS. 2 and 3, except as noted. In this embodiment, the outer layer 94 may have a thickness $t_4$ which is equivalent to $t_2$ (or equivalent to $t_2+t_3$) in FIG. 2. The outer layer 94 is bonded directly to the core 90. In this embodiment, the core and/or shaft 92 may be formed, at least in part, of an electrically-conductive metal or alloy, such as copper, aluminum, steel, and/or brass, to serve as a grounded biasing member in place of the omitted intermediate layer.

Returning to FIG. 1, in some embodiments, the marking device 12, includes a pre-marking station 14, located upstream of the main marking station 16, and/or a post-marking station 18, located downstream of the main marking station 16. This arrangement facilitates using more/different colors to those employed in the main marking station. The pre-marking station 14 and/or post-marking station 18 may each be configured to accept one or more of a set of two or more interchangeable developer housings 110, 112, 114, 116, 118, 120, each holding a respective custom-color, metallic, magnetic (MICR), and/or transparent toner. The pre- and post-marking station(s) 14, 18 may be electrophotographic marking devices in which toner images are transferred to a photoreceptor in the form of a belt or drum and from the photoreceptor directly to the sheet 22, or indirectly, e.g., via an intermediate transfer belt. A respective transfer device 122, 124, such as a transfer corotron, causes the toner images to be transferred to the sheet. In other embodiments, one or more color stations, analogous to color station 16, may be employed as a pre- and/or post-marking station 14, 18.

While particular reference is made to electrophotographic marking stations, the pre- and/or post-marking stations 14, 18 may additionally or alternatively include ink-jet printers, including solid ink printers, thermal head printers that are used in conjunction with heat sensitive paper, and/or other devices capable of marking an image (or image layer) on a print media sheet.

The marking device 12 may be configured such that the pre- and post-marking station(s) 14, 18 may be added as after-market components, e.g., when a customer desires to provide for printing with additional toners than can be accommodated by the main marking station 16. Alternatively, or additionally, the marking device 12 may be configured to allow the pre- and post-marking station(s) 14, 18 to be added during manufacture, e.g., as a customer-specifiable option, by installing the additional marking stations on a standard frame. This provides a flexible architecture which can be customized for each customer, without modifying the footprint of the printer.

The exemplary printing device 1 can achieve a number of advantages over existing printing devices, such as one or more of: unit cost, a lower run cost, greater durability, a higher productivity, a reduced footprint, an increased and/or variable number of toner colors, improved registration, a flexibility for higher speed printing, opportunity to customize with pre- and post-marking stations, and the like.

The exemplary transfer member 32 of the main marking station 16 effectively combines the advantages of an intermediate transfer belt (via outer layer 94) and a bias transfer roll (via intermediate layer 96) with a rigid core 90, all of which are rotated synchronously around a common axis in a single structure 32. This has advantages over a conventional free-standing intermediate transfer belt, due in part to the benefits rotation brings to the structure (better registration, smaller footprint, speedup flexibility, and so forth) and the simplicity of a single part acting as both a bias transfer roll and an intermediate transfer belt. Additionally, since the outer layer 94 is supported on a rigid core 90, it can be substantially thinner than a conventional intermediate transfer belt (e.g., about 50% of the thickness, or less).

Figure 5:
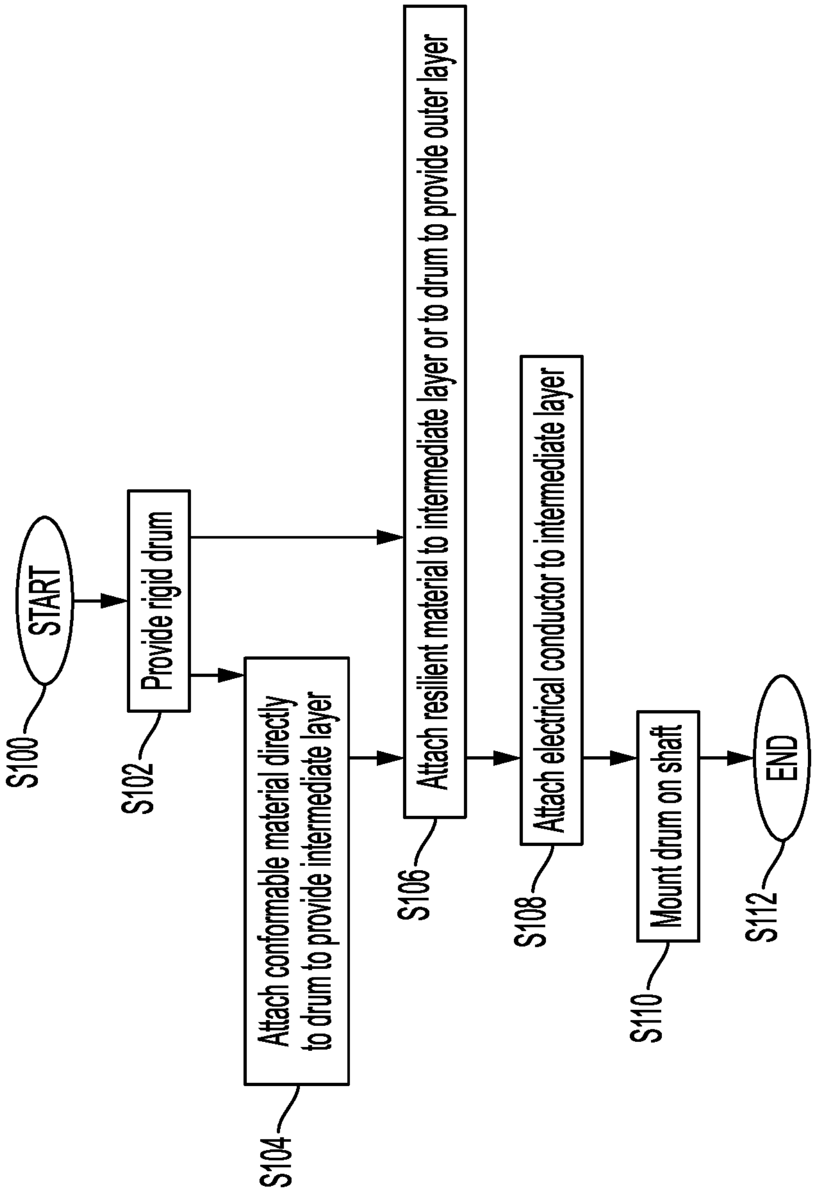
FIG. 5 is a flow chart which illustrates a method of forming one of the transfer members of FIGS. 1-4.

With reference to FIG. 5, a method of forming a transfer member 32 is illustrated. The method begins at S100.

At S102, a cylindrical core member, such as a drum 90 is provided.

At S104, one or more layers of electrically-conductive conformable material is/are optionally attached to the drum 90 to provide an intermediate layer 96 of uniform thickness. This may include coating the drum 90 with a coating material which forms a conformable layer 96 when cured or otherwise set.

At S106, one or more layers of a resilient material are attached to the drum 90 or layer 96, if used, to provide an outer layer 94 of uniform thickness. This may include coating the drum 90 and/or layer 96 with a coating material which forms a resilient layer 94 when cured or otherwise set.

At S108, an electrical conductor, e.g., an electrical wire or wires is connected to the intermediate layer 96 to enable layer 96 to be grounded. In some embodiments the shaft may serve as the electrical conductor.

At S110, the drum 90 is mounted on a shaft 92.

The method ends at S112.

Figure 6:
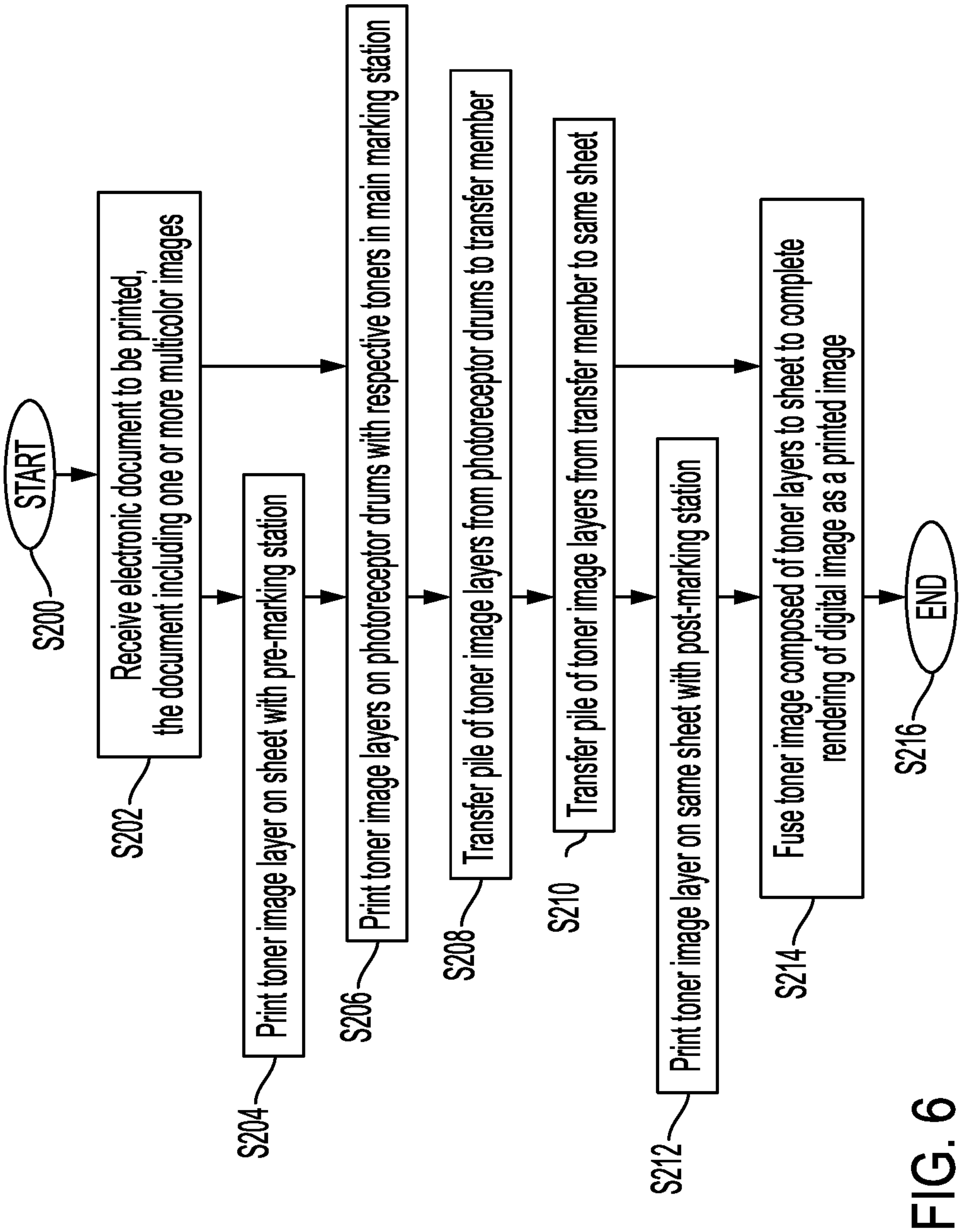
FIG. 6 is a flow chart which illustrates a method of printing with one of the transfer members of FIGS. 1-4.

With reference now to FIG. 6, a method of rendering an image on print media is described. The method may be performed with the device of FIG. 1. The method begins at S200.

At S202, a multicolor electronic document is received for printing.

At S204, as a sheet 22 of print media is conveyed along the print media path 26, a first toner image layer may be deposited on the sheet at the pre-marking station 14.

At S206, as the sheet 22 is transferred along the print media path 26 to the main marking station 16, additional toner image layers may be formed on one or more of the photoreceptor drums 54 of the main marking station 16 and at S208, transferred to the transfer member 32.

At S210, the additional toner layers are transferred from the transfer member 32 directly to the sheet 22, in registration with the first and/or additional toner image layer(s).

At S212, as the sheet 22 of print media is conveyed along the print media path, a further toner image layer may be deposited on the sheet at the post-marking station 18, in registration with the toner image layers previously applied.

At S214, the toner sheet is conveyed along the print media path 26 to the fuser 38, where the pile of toner image layers is fused to the sheet to form a printed image. Prior to being output, the printed sheet may undergo one or more finishing operations.

The method ends at S216.

As will be appreciated, the method need not proceed exactly in the order described.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A printing device comprising:
a main marking station comprising:
a transfer member comprising:
a shaft,
a rigid cylindrical core member, mounted on the shaft,
an outer layer supported on the rigid cylindrical core member, the outer layer defining an outer surface of the transfer member, which is configured for receiving a toner image thereon, the cylindrical core and outer layer having a same axis of rotation as the shaft, and
an electrical conductor for electrically biasing the rigid cylindrical core;

a plurality of color stations, each of the color stations including a photoreceptor drum, each of the photoreceptor drums and the outer surface of the transfer member defining a respective first transfer nip therebetween, whereby toner image layers are transferred from the photoreceptor drum to the transfer member;

at least one of:

a pre-marking station, located upstream of the main marking station, which prints a toner image layer on an associated sheet of print media, and a post-marking station, located downstream of the main marking station, which prints a toner image layer on the associated sheet of print media, whereby a toner image is formed on the associated sheet from two or more toner image layers printed by the main marking station and the at least one of the pre-marking station and the post-marking station;

a print media path which conveys associated sheets of print media to a second transfer nip where the toner image layers are transferred from the transfer member to the sheets to form toner images; and a fuser, downstream of the main marking station, which fuses the toner images more permanently to the sheets, the print media path connecting the main marking station and the at least one of the pre-marking station and post-marking station with the fuser.

2. A The printing device of claim 1, wherein the cylindrical core member of the transfer member defines a cylindrical wall with a thickness of at least 1 mm.

3. The printing device of claim 1, wherein a ratio of an outer diameter of the cylindrical core member to an outer diameter of the transfer member is at least at least 0.8:1.

4. The printing device of claim 1, wherein the cylindrical core member of the transfer member is formed of metal and/or a metal alloy.

5. The printing device of claim 1, wherein the outer layer of the transfer member has a thickness of at least 0.01 mm.

6. The printing device of claim 1, wherein the outer layer of the transfer member comprises one or more organic polymers.

7. The printing device of claim 6, wherein the one or more organic polymers comprises a polyimide.

8. The printing device of claim 1, wherein the outer layer of the transfer member is a seamless layer.

9. The printing device of claim 1, wherein the outer surface of the outer layer of the transfer member is not photoconductive.

10. A method of printing with the printing device of claim 1, comprising:

forming toner image layers on the plurality of photoreceptor drums;

transferring the toner image layers to the surface of the transfer member; and transferring the toner image layers from the surface of the transfer member to a sheet of print media to form a toner image;

forming a toner image on the sheet of print media with the at least one of the pre-marking station and the post-marking station; and fusing the toner images more permanently to the sheet with the fuser.

11. The printing device of claim 1, wherein the intermediate layer of the transfer member has a thickness of at least 1 mm.

12. The printing device of claim 1, wherein the intermediate layer of the transfer member is formed of a foam rubber.

13. The printing device of claim 1, wherein the intermediate layer of the transfer member is seamless.

14. The printing device of claim 1, wherein the main marking station further comprises a transferring unit which assists in transferring the toner images directly from the outer surface of the transfer member to one or more associated sheets of print media.

15. The printing of claim 1, wherein the main marking station further comprises at least one of:

a pre-transfer station, which is positioned before the first transfer nip of one of the color stations, to improve toner image layer transfer to the transfer member;

a cleaning device, for cleaning toner image residue from the surface of the transfer member; and a pre-transfer device, which is located between a last of the color stations and a second transfer nip formed between the transfer member and a sheet support member.

16. A printing device comprising:

a main marking station comprising:

a cylindrical transfer member comprising:

a rigid cylindrical core member, an intermediate layer, formed from a dielectric material, bonded to the core member, and an outer layer bonded to the intermediate layer, the outer layer defining an outer surface of the transfer member;

a plurality of color stations arranged around the transfer member, each of the color stations including a photoreceptor drum on which toner image layers are formed, the photoreceptor drum being electrically biased relative to the surface of the transfer member, the toner image layers being transferred from the photoreceptor drum and the surface of the transfer member at a first transfer nip and transferred from the transfer member to a sheet of print media at a second transfer nip;

a fuser;

at least one of:

a pre-marking station, located upstream of the main marking station, which prints a toner image layer on an associated sheet of print media, and a post-marking station, located downstream of the main marking station, which prints a toner image layer on the associated sheet of print media, whereby a toner image is formed on the associated sheet from two or more toner image layers printed by the main marking station and the at least one of the pre-marking station and the post-marking station; and a print media path connecting the main marking station and the at least one of the pre-marking station and post-marking station with the fuser.

* * * * *